United States Patent Office 3,136,731
Patented June 9, 1964

3,136,731
METHOD OF PREPARING POLYURETHANE WITH A DELAYED ACTION CATALYST
Helmut Piechota and Wulf von Bonin, Leverkusen, Germany, assignors to Farbenfabriken Bayer Aktiengesellschaft, Leverkusen, Germany, a corporation of Germany
No Drawing. Filed Mar. 6, 1962, Ser. No. 177,745
Claims priority, application Germany Mar. 9, 1961
17 Claims. (Cl. 260—2.5)

This invention relates to the production of polyurethane plastics and more particularly to the production of polyurethane plastic foam and to the catalysis of the reactions leading to the production of this plastic foam material.

In the production of polyurethane foam, a catalyst is conventionally used to promote the reaction between the active hydrogen containing component and the isocyanate component used in the preparation of these plastics as well as for the water isocyanate reaction where water is used as a blowing agent in the production of these plastics. The catalysis of the reaction is especially important where all of the reactive components are combined in essentially a single stage process. Moreover, when filling a large or complicated cavity with polyurethane foam, it is desirable to carry out the filling of the cavity in more than one stage. The time which elapses between the combination of the foaming ingredients and the rising and setting of the foaming composition is very short. Furthermore, the surface of the polyurethane foam sets after a very short time so that subsequent or additional layers of foam will have defective adhesion at the layer boundaries. It would therefore be desirable to produce a polyurethane foam which would remain tacky on the surface for a substantial period of time so that an additional layer would stick to the previous layer.

One method of accomplishing this result is to prepare the polyurethane foam in the presence of a catalyst which will only gradually develop its full efficiency. This has been done heretofore by using the synthetic or natural zeolite adsorbents such as, for example, those disclosed in U.S. Patent 2,882,244 as a support for the catalyst. When the catalyst is adsorbed on a support, it is only released at an elevated temperature or with the passage of sufficient time so that in a polyurethane foam formulation it will have a delayed action effect which will leave the surface of the foam tacky for sufficient time to add a subsequent layer. This has proven particularly advantageous when filling large volumes. Filling large volumes heretofore has been difficult due to the heat generated by the foaming reaction which causes splits and voids in the foam. The zeolite adsorbents have not been satisfactory because they will not contain the catalyst at ordinary temperatures for more than about 24 hours. This short storage time is inconvenient in the production of polyurethane plastics.

It is therefore an object of this invention to provide a method of preparing polyurethane plastics with a delayed action catalyst. Another object of this invention is to provide a novel catalyst support composition for the catalysis of polyurethane foaming reactions. Still a further object of this invention is to provide a supported catalyst for the polyurethane foam which will remain on the support for a relatively long storage time. Another object of this invention is to provide an improved method of foaming large volumes of polyurethane plastics. A still further object of this invention is to provide improved polyurethane plastics in complicated shapes and the like.

The foregoing objects and others which will become apparent from the following description are accomplished in accordance with the invention, generally speaking, by providing a method for catalyzing the reaction between an organic isocyanate and an organic compound containing at least one active hydrogen atom as determined by the Zerewitinoff method by sorbing on an organic support having a density of from about 0.01 to about 0.6 kg./cm.$^3$ a catalyst capable of promoting said reaction and allowing said organic isocyanate and said compound containing active hydrogen to react in the presence thereof. In other words, this invention contemplates a catalyst sorbed on a support and a method of catalyzing the reaction between an organic isocyanate and an organic compound containing at least one active hydrogen atom as determined by the Zerewitinoff method in the presence thereof.

The organic support must have a density of from about 0.01 to about 0.6 kg./cm.$^3$. Its density is preferably within the range of from about 0.03 to about 0.2 kg./cm.$^3$. The particle size of the support is preferably within the range of from about 0.01 to about 7 mm. and most preferably between about 0.1 and about 4 mm. Moreover, the organic support is preferably in the form of beads or pearls which can be agglomerated. The beads are preferably hollow and their walls are normally perforated with pores or fissures.

The organic supports which have been found suitable for carrying out the method of the present invention are polymethylmethacrylate, polystyrene, polyvinyl acetate, polyvinyl chloride, copolymers of ethylacrylate, copolymers of methylmethacrylate, and copolymers of vinyl acetate. The copolymers may be prepared from any suitable copolymerizable substance including, for example, copolymers of methylmethacrylate with ethylacrylate, vinyl acetate and the like. The catalyst supports are generally foraminous even though they may be in large chunks after they have been prepared. It is also advantageous, however, to prepare the organic supports by suspension polymerization in the presence of a solvent such as water, petroleum ether or the like which will cause them to agglomerate into small particles suitable to be dispersed in the media that they are to catalyze. The catalyst supports preferably have a molecular weight below about 20,000.

The catalyst supports are loaded with the catalyst capable of promoting the reaction between an isocyanate and an organic compound containing an active hydrogen atom by simply contacting the two. It is preferred, however, to dissolve the catalyst in a volatile solvent and preferably an ether solvent such as diethyl ether, or an halogenated hydrocarbon such as dichlorobenzene which will not dissolve the organic support and then contact the organic support with the catalyst in solution and subsequently allow the solvent to evaporate. Instead of using solvents, it is also possible to use emulsions or suspensions and subsequently evaporate the volatile components. In some cases, the catalyst itself is volatile and may be used on the support in the "wet" condition. In some cases, it is necessary to charge the support with the catalyst under pressure and in other cases, the catalyst support is loaded under a partial vacuum.

The catalyst support is loaded with any suitable amount of the catalyst but preferably about 0.1 to about 30 percent by weight based on the weight of the catalyst and support and most preferably from about 5 to about 15 percent by weight.

Any suitable organic compound containing active hydrogen atoms as determined by the Zerewitinoff method may be used. Specific examples of active hydrogen containing groups are, for example, hydroxyl groups, carboxylic acid groups, primary amino groups, secondary amino groups, urethane groups, urea groups, biuret groups, allophanate groups, mercapto groups and the like. Therefore, any compound which has an active hydrogen atom and which enters into a reaction with an organic polyisocyanate through said active hydrogen atom to produce urethanes, ureas, allophanates, biurets and the like may be used. It is preferred to use organic compounds containing active hydrogen atoms as determined by the Zerewitinoff method which yield urethanes when reacted with an organic polyisocyanate. Among compounds contemplated by the invention are polyesters including polyester amides, polyhydric polyalkylene ethers, polyhydric polythioethers, polyhydric alcohols of other types including long chain dihydric alcohols and the like, the reaction product of phenols with alkylene oxides, the reaction product of phenol formaldehyde resins with alkylene oxides, the reaction product of an amine with an alkylene oxide, polyamines, phenols per se; hydrogenation products of fatty acids, urethanes which have only urethane hydrogen atoms, ureas, polyamides, polyacetals, alcohols, amines, mercaptans and the like which contain only one active hydrogen atom and the like.

Any suitable polyester may be used and may contain terminal hydroxyl groups, terminal carboxylic acid groups, amino groups or the like. Moreover, the polyester may be a polyester amide which was prepared by condensing an amino alcohol containing both free amino groups and free hydroxyl groups with the other components used in the preparation of polyesters. The polyester may be prepared by reacting a polycarboxylic acid or hydroxy carboxylic acid with monohydric or polyhydric alcohols. It is also possible to use with amino alcohols, such as ethanol amine, diamines such as ethylene diamine, polyethylene diamine, 1,4-butylene diamine and the like. Amines such as diethyl ether diamine or amino carboxylic acids such as glycine, alanine, valine, phenylalanine, hydroxyproline and the like may also be used. The polyesters may contain hetero atoms in addition to the ester groups including oxygen, sulfur, nitrogen and the like in the chain. Moreover, the radicals making up the polyester may be either saturated or unsaturated and may contain double or triple bonds as well as modifying radicals of saturated or unsaturated fatty acids such as oleic acid or fatty alcohols such as oleyl alcohol and the like.

Any suitable polycarboxllic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxlic acid, 3,4,9,10 - perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7 - heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohols such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed in 1859 by Wurtz and in Encyclopedia of Chemical Technology, Volume 7, pages 257 to 262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

Any suitable polyhydric alcohol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexane-1,6-diol, 2-heptane-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptane-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-5-aminomethyl pyrimidine, 2,5-diamine-1,3,4-thiadiazol and the like.

Any suitable reaction product of a phenol with an alkylene oxide may be used such as, for example, those disclosed in U.S. Patent 2,843,568, such as, for example, the reaction product of hydroquinone with ethylene oxide to give a polyalkylene arylene ether glycol having a molecular weight above about 750 or other polyalkylene arylene ether glycols disclosed in said patent.

Any suitable reaction product of a phenol-aldehyde resin with an alkylene oxide may be used such as, for example, a novolak having the formula

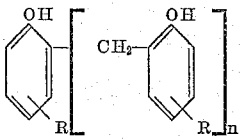

wherein $n$ is 1 to 5 and R is a lower alkyl radical such as methyl, ethyl, propyl, butyl, tertiary butyl and the like reacted with an alkylene oxide such as those disclosed above for the preparation of the polyhydric polyalkylene ethers.

Any suitable reaction product of an amine with an alkylene oxide may be used such as, for example, the reaction product of aniline, a toluylene diamine such as, 2,4-toluylene diamine, 2,6-toluylene diamine or the like, a diphenylmethane diamine such as 4,4'-diamino diphenyl methane or the like, a xylylene diamine such as, for example, p-amino aniline, as well as alkylene diamines such as, for example, ethylene diamine, propylene diamine, 1,4-butylene diamine, hexamethylene diamine and the like including 1,10-dodecane diamine.

Any suitable phenol may be used such as, for example, hydroquinone, phenol per se; 2,2-bis(p-hydroxy phenyl) propane (Bisphenol A), cresol and the like. It is also possible to use the hydrogenation products of fatty acids such as, for example, the hydrogenation products of tall oil and the like.

Any suitable urethane may be used which is obtained by the reaction of an organic isocyanate with an hydroxyl compound, whether or not the urethane contains other active hydrogen containing groups besides the urethane hydrogen. In other words, a urethane which has all the terminal isocyanato groups and terminal hydroxyl groups blocked with monofunctional components is also contemplated by the present invention.

Any suitable urea may be used such as those obtained by reacting an isocyanate with water or with an amine such as ethylene amine, propyl amine, aniline and the like.

Any suitable polyamide may be used such as, for example, those obtained by reacting adipic acid with hexamethylene diamine and the like.

Any suitable polyacetal may be used such as, for example, the reaction product of formaldehyde or other suitable aldehydes with a polyhydric alcohol such as those disclosed above for use in the preparation of the hydroxyl polyester.

Other substances include natural substances such as castor oil or virtually any substance which contains active hydrogen containing groups as determined by the Zerewitinoff method will have its reaction with an organic polyisocyanate catalyzed in accordance with the present invention.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are therefore ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenyl methane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. Additional examples are the urea polyisocyanates such as are obtained by reacting two mols of toluylene diisocyanate with one mol of water as disclosed, for example, in U.S. Patent 2,757,185. The isocyanates may be used in refined or crude form such as crude toluylene diisocyanates as are obtained by the phosgenation of a mixture of toluylene diamines or crude diphenyl methane isocyanates such as those obtained by the phosgenation of crude diphenyl methane diamine.

Any catalyst which is capable of catalyzing the reaction between an active hydrogen containing compound and an isocyanate is contemplated by the invention. This includes all of the heretofore known catalysts for urethane reactions which are preferably basic organic accelerators such as, tertiary amines or non-basic metallic compounds such as those disclosed in U.S. Patent 2,846,408, and the compounds for the catalysis of the isocyanate-hydroxyl reaction disclosed in the "Journal of Applied Polymer Science," Volume IV, Issue No. 11, pages 207 to 211 (1960). It is not possible to mention here each and every catalyst which is contemplated by the invention because to do so would take up too much space. It is only possible to mention some of the more important examples of catalysts which may be sorbed (i.e. either adsorbed or absorbed) on the substrates more particularly set forth elsewhere. The tertiary amines may be used such as hexahydrodimethyl aniline, triethyl amine, N-ethylmorpholine, N-methyl-N'-dimethyl-aminoethyl piperazine, triethylene diamine, permethylated diethylene triamine, bis-aminoethanol adipate, N-methyl morpholine, dimethyl laurylamine, N-laurylmorpholine amine, dimethyl cetyl amine, N,N,N',N'-tetramethyl-1,3-butylene diamine, diethyl ethanol amine, N-coco-morpholine, 3-ethyl-N-dimethyl propyl amine, N-dimethyl-N-methyl-isopropyl propylene diamine, N-dimethyl amino propyl acetamide, N,N-diethyl-3-dimethyl amino propyl amine, dimethyl benzoyl amine, hydramethyl morpholine, dimethyl propyl amine, N,N-diethyl ethanol amine benzoate, diethylene amino ethanol benzene and the like.

Any suitable metal catalyst may be used such as, for example, bismuth, nitrate, lead-2-ethylhexoate, lead benzoate, lead oleate, butyl tin trichloride, stannic chloride, tributyl-tin cyanate, stannous octoate, stannous oleate, dibutyl-tin-di(2-ethyl hexoate), dibenzyl-tin-di(2-ethyl hexoate), dibutyl-tin dilaurate, dibutyl-tin diisooctylmaleate, dibutyl-tin sulfide, dibtuyl-tin dibutoxide, dibutyl-tin-bis-(o-phenylphenate), dibutyl-tin-bis(acetylacetonate), di(2-ethylhexyl) tin oxide, titanium tetrachloride, dibutyltitanium dichloride, tetrabutyl titanate, butoxytitanium trichloride, ferric chloride, ferric-2-ethyl-hexoate, ferric acetylacetonate, antimony trichloride, antimony pentachloride, triphenylantimony dichloride, uranyl nitrate, cadmium nitrate, cadmium diethyldithiophosphate, cobalt benzoate, cobalt-2-ethyl hexoate, thorium nitrate, triphenyl aluminum, trioctyl aluminum, aluminum oleate, diphenyl mercury, zinc-2-hexoate, zinc naphthenate, nickel naphthenate, molybdenum hexacarbonyl, cerium nitrate, vanadium trichloride, cupric-2-ethyl hexoate, cupric acetate, manganese-2-ethyl hexoate, manganese linoresinate, zirconium-2-ethyl hexoate and zirconium naphthenate and the like. The preferred catalyst of the tertiary amines and the organo-tin compounds especially triethylene diamine, stannous octoate, stannous oleate, dibutyl-tin-dilaurate, dibutyl-tin-di(2-ethyl hexoate) and the like.

The method of the invention is to simply combine an organic isocyanate and preferably an organic polyisocyanate with an organic compound containing at least one active hydrogen atom as determined by the Zerewitinoff method and preferably an organic compound containing at least two active hydrogen containing groups as determined by the Zerewitinoff method in the presence of the catalyst on the organic support. The combination of the catalyst and support may be combined with the other reactants by adding the combined catalyst support to either of the reactants or the reactants may be combined and then the catalyst may be added. The preferred procedure, particularly when using mechanical equipment and operating on a large commercial scale, is to mix the catalyst support combination with the active hydrogen containing compound and then combine this mixture with the organic isocyanate.

The most advantageous application of the catalyst support of the invention is for the preparation of cellular polyurethane plastics but the method of the invention is applicable to any other process where the reaction between an isocyanate and an active hydrogen containing compound is contemplated including the preparation of polyurethane elastomers, polyurethane coating compositions, polyurethane millable gums and the like. In the foaming reaction, the catalyst on the support delays the effect of the catalyst so that large volumes can be filled with cellular polyurethane plastics. In other words, the catalyst operates to effectively catalyze the right combination of reactants to produce a foam and yet does not cause so rapid curing of the foam that subsequent layers will not adhere to previous layers of polyurethane foam. Often because of the size of equipment used to prepare the foaming ingredients and because of the heat of reaction leading to fissures and large holes in the center of the foam block, large cavities must be filled in stages. It is here that the supported catalyst of the invention finds its greatest utility. The supported catalyst can, therefore, be combined with, for example, an hydroxyl polyester or polyhydric polyalkylene ether and then the mixture is combined with an organic polyisocyanate and a blowing agent as more particularly set forth below and with the commencement of the foaming reaction and the heating of the foaming mixture caused thereby, the catalyst is gradually displaced from the organic support and only then develops its greatest efficiency. By this means, the commencement of the reaction is retarded and where complicated mold designs are to be filled, the reaction mixture has time to flow into all the cavity without the property diagram of the foam material being disadvantageously influenced. Moreover, the rise of the foam is smooth and uniform and the danger of the formation of large holes is reduced. Still further, the brittleness of the final foam material is less.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula.

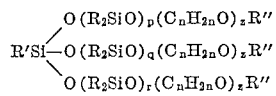

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

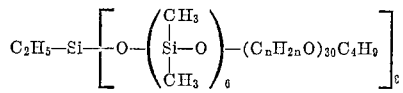

wherein $(C_nH_{2n}O)$ is a mixed polyoxyethylene and oxypropylene block copolymer containing about 17 oxyethylene units and about 13 oxypropylene units.

Specific compounds containing one active hydrogen atom of the class referred to above are methanol, ethanol, propanol, butanol, phenol, ethyl mercaptan, and the like.

The cellular polyurethane plastics may be prepared using carbon dioxide generated by water reacted with excess organic polyisocyanate as a blowing agent or a halohydrocarbon such as dichlorodifluoromethane, trichlorofluoromethane and the like, azo compounds such as, for example, diazoaminobenzene, or low boiling point alkanes such as pentene may be used.

The invention is also applicable to the preparation of coating compositions and here the advantage is that the coating may be applied and then only cured when the heat of reaction is sufficient to release the catalyst. For the preparation of coating compositions, it is often advantageous to use isocyanates which have a high vapor pressure such as, for example, the reaction product of trimethylolpropane with a toluylene diisocyanate. The coating compositions are prepared by simply combining the isocyanate with the active hydrogen containing compound in the presence of the supported catalyst and applying the coating to a support such as wood, metal or the like by brushing, rolling or any other suitable method.

Polyurethane elastomers may be prepared by reacting either a polyurethane prepolymer or a combination of a high molecular weight organic compound having active hydrogen containing groups with a low molecular weight organic compound containing active hydrogen and an organic polyisocyanate. In the prepolymer method, the high molecular weight organic compound such as an hydroxyl polyester or polyhydric polyalkylene ether having a molecular weight of about 1000 is combined with an excess of an organic polyisocyanate in a first step and then the polyurethane having free —NCO groups is reacted with a low molecular weight compound such as an amine or alcohol including ethylene diamine, 1,4-butane diol, the bis-(beta-hydroxy ethyl ether) of hydroquinone or the like in a second stage. At any stage in this process, the supported catalyst may be used.

Millable gums may also be prepared in accordance with the present invention by combining the supported catalyst with, for example, a polyurethane prepolymer as disclosed above and then bringing about the reaction with water to yield a urea which is suitable to be cured. In this process, the catalyst is only gradually released during the milling of the prepolymer to yield a polyurethane-polyurea product.

The compounds prepared by the method of the invention are useful in many applications including the coating of substrates such as wood, metal and the like as set forth above, the filling of large cavities for both sound and thermal insulation with the polyurethane foams and the preparation of pillows, cushions, upholstered articles and the like.

The invention is further illustrated by the following examples in which the parts are by weight unless otherwise indicated.

COMPARISON EXPERIMENT

About 500 parts of propoxylated trimethylol propane (OH number about 350) are mixed with about 20 parts of propoxylated ethylene diamine and with about 30 parts of a polyester of adipic acid, phthalic acid and trimethylol propane (OH number about 380). About 0.1 part of dibutyl-tin dilaurate, 2 parts of a sodium salt of a sulfonated castor oil (water content 50%), about 0.5 part of permethylated diethylene triamine and about 0.5 part of N-methyl-N'-dimethylamino-ethyl piperazine, as well as about 0.5 part of a siloxane-modified polyether are added thereto. Finally, a mixture of about 114 parts of diphenyl methane-4,4'-diisocyanate and about 30 parts of trichloromonofluoro methane is incorporated by stirring. After adding the isocyanate, the mixture is stirred for about 15 seconds and then poured into a mold, in which the composition foams to give a foam material containing about one urea group for about each three urethane groups.

The following times are established:

| | Seconds |
|---|---|
| Stirring time (measured from the time of adding the isocyanate) | 15 |
| Standing time (from pouring into the mold until reaching a height of 2 cm.) | 2 |
| Rising and setting time (measured from end of the standing time) | 52 |

Example 1

The procedure is as set out in the comparison experiment, except that the dibutyl-tin dilaurate is introduced in the ratio of about 1:10 into a hollow polymer having a mean particle diameter as indicated in the table and produced by suspension polymerization of methyl methacrylate in the presence of water and about 300% (related to the weight of monomer) of petroleum ether and added in this form to the mixture.

The times for various particle diameters are shown in the following table:

| Particle diameter | Stirring time, sec. | Standing time, sec. | Rising and Setting time, sec. |
|---|---|---|---|
| About 150μ | 15 | 8 | 77 |
| About 200μ | 15 | 9 | 75 |
| About 300μ | 15 | 12 | 75 |

Example 2

The procedure is as set out in the comparison example, except that the N-methyl-N'-dimethylaminoethyl piperazine and the permethylated diethylene triamine are introduced in the ratio of about 1:5 into a methyl methacrylate hollow polymer according to Example 1 (mean particle diameter about 300μ) and added in this form to the mixture.

| | Sec. |
|---|---|
| Stirring time | 15 |
| Standing time | 12 |
| Rising and setting time | 90 |

Example 3

The procedure is as in the comparison example, except that dibutyl-tin dilaurate, N-methyl-N'-dimethylamino ethyl piperazine and permethylated diethylene triamine are introduced in the ratio of about 1:10 into a methyl methacrylate hollow polymer according to Example 1 (mean particle diameter about 300μ) and added in this form to the mixture.

| | Sec. |
|---|---|
| Stirring time | 15 |
| Standing time | 30 |
| Rising and setting time | 155 |

Example 4

100 grams of a polyester prepared from adipic acid, ethylene glycol and butylene glycol (OH number 52, acid number 1,2) are mixed at 90° C. with 18 grams of 4,4'-diphenylmethane diisocyanate.

The mixture is stirred for 10 minutes at 95° C. and then mixed with 4.5 grams of 1.4-butane diol. By treating the reaction product at 90° C. for 15 hours a plastic mass is obtained.

100 grams of the plastic mass are mixed on a rubber roller with 20 grams of carbon black, 10 grams of dimeric 2.4-toluylene diisocyanate and 2.5 grams of the polymer-catalyst-composition of Example 2. The mixture is applied to a terephthalate polyester fabric on a cold calendar at a thickness of 0.3 mm. By heating for 10 minutes to 80° C. a coating is obtained with excellent elasticity and abrasion resistance.

Example 5

This example shows the preparation of the hollow polymer used in the foregoing examples.

In a steel autoclave provided with a stirrer the following ingredients are introduced: 2100 ml. of water, 30 ml. of a 5% polyvinyl alcohol solution, 900 grams of petrol ether (B.P.: 40 to 70° C.), 90 grams of magnesium sulphate hepta hydrate, 750 ml. of n-sodium hydroxide.

The autoclave is closed and filled with nitrogen at 10 atü. A solution of 3 grams of azodiisobutyronitril in 300 grams of methylmethacrylate is introduced under pressure into the autoclave. The content is stirred with 500 rotations per minute for 5 hours at 60° C. Then the autoclave is cooled down to about 30° C. and the pressure released. The polymer obtained is washed with diluted hydrochloric acid and then with water and finally air-dried at 55° C. The polymer has a bulk density of about 0.08 g./ml. and consists of hollow beads which are partially deformed and has a diameter of from about 100 to about 350μ. The beads can be sieved out into separate fractions of different diameter. The beads of such different average diameter have been used in the foregoing examples.

By means of increased speed of stirring and by increase of the amount of added polyvinyl alcohol solution the diameter of the beads can be lowered.

If under the indicated conditions the 300 grams of methylmethacrylate are replaced by a mixture of 204 grams of methylmethacrylate and 60 grams of ethylacrylate, beads are obtained with a maximum diameter of 1.5 mm. If 150 grams of methylmethacrylate are polymerside together with 150 grams of ethyl acrylate under the very same conditions, beads of a maximum diameter of 3.5 mm. are obtained.

It is to be understood that any other suitable organic isocyanate or compound containing active hydrogen atoms, catalyst capable of promoting the reaction between the isocyanate and the active hydrogen atom, organic support or the like could have been used in the foregoing working examples providing that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of catalyzing the reaction between an organic isocyanate and an organic compound containing at least one active hydrogen atom as determined by the Zerewitinoff method which comprises carrying out said reaction in the presence of a catalyst capable of promoting said reaction which is sorbed on an organic support having a particle size of from about 0.01 to about 7 mm. and a density of from about 0.01 to about 0.6 kg./cm.$^3$ selected from the group consisting of polymethylmethacrylate, polystyrene, polyvinyl acetate, polyvinyl chloride, copolymers of methylmethacrylate and ethylacrylate and copolymers of methylmethacrylate and vinyl acetate.

2. The method of claim 1 wherein said organic support is in bead form and has a particle size of from about 0.1 to about 4 mm.

3. The method of claim 1 wherein said organic support is in hollow bead form with perforated walls.

4. The method of claim 1 wherein said organic support has a density of from about 0.03 to about 0.2 kg./cm.$^3$.

5. The method of claim 1 wherein said catalyst capable of promoting the reaction between the organic isocyanate and the organic compound containing active hydrogen atoms is a metal compound.

6. The method of claim 1 wherein said catalyst capable of promoting the reaction between the organic isocyanate and the organic compound containing active hydrogen atoms is a tin compound.

7. The method of claim 1 wherein said catalyst capable of promoting the reaction between the organic isocyanate and the organic compound containing active hydrogen atoms is a tertiary amine.

8. A method of making polyurethanes which comprises reacting an organic polyisocyanate with an organic compound containing at least two active hydrogen containing groups as determined by the Zerewitinoff method in the presence of a catalyst capable of promoting said reaction which is sorbed on an organic support having a particle size of from about 0.01 to about 7 mm. and a density of from about 0.01 to about 0.6 kg./cm.$^3$ selected from the group consisting of polymethylmethacrylate, polystyrene, polyvinyl acetate, polyvinyl chloride, copolymers of methylmethacrylate and ethylacrylate and copolymers of methylmethacrylate and vinyl acetate.

9. The method of claim 8 wherein said reaction is carried out in the presence of a blowing agent to produce a polyurethane foam.

10. The method of claim 8 wherein said active hydrogen containing compound is an hydroxyl polyester.

11. The method of claim 8 wherein said active hydrogen compound is a polyhydric polyalkylene ether.

12. The method of claim 8 wherein said catalyst is a metal catalyst.

13. The method of claim 8 wherein said catalyst is a tin catalyst.

14. The method of claim 8 wherein said catalyst is a tertiary amine.

15. The method of claim 8 wherein said catalyst is a mixture of a metal compound and a tertiary amine.

16. The method of claim 8 wherein said catalyst is a mixture of a tin compound and a tertiary amine.

17. The method of claim 8 wherein said reaction is carried out on a substrate to prepare a polyurethane coating.

References Cited in the file of this patent

UNITED STATES PATENTS 2,967,834     Daniels _____ Jan. 10, 1961